G. B. HUMES.
CONTROL LEVER DETENT.
APPLICATION FILED OCT. 31, 1918.
1,311,400.
Patented July 29, 1919.
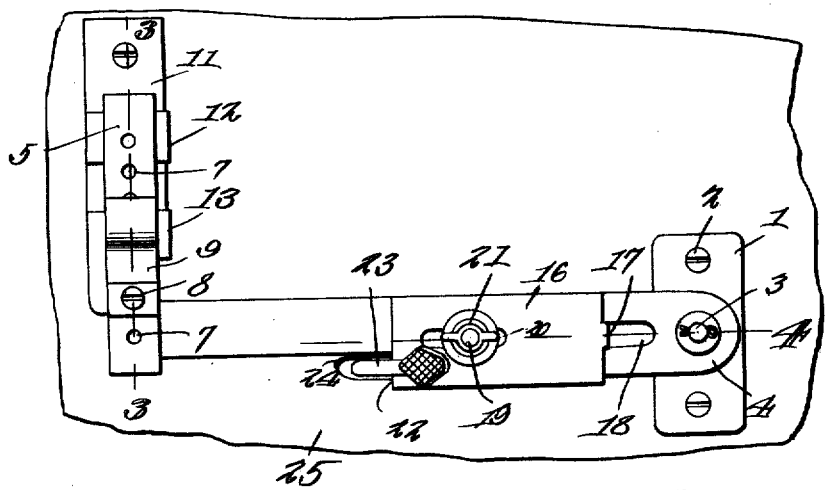
Fig. 1.
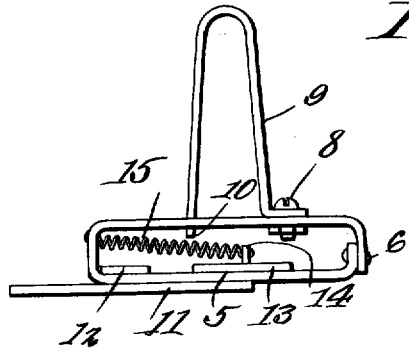
Fig. 2.
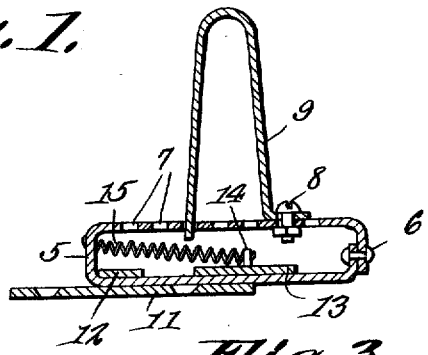
Fig. 3.
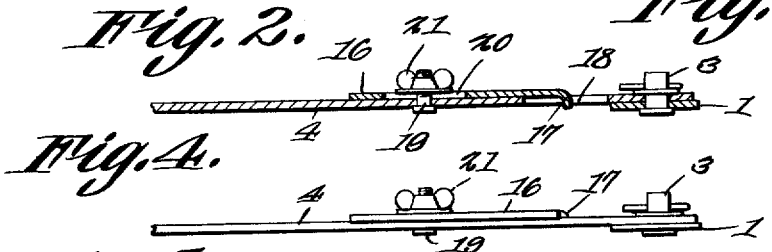
Fig. 4.
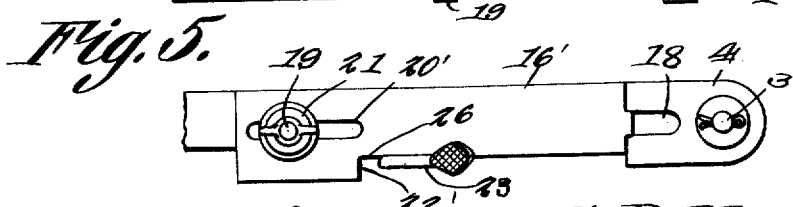
Fig. 5.
Fig. 6.
Witness
F. B. Worden.
Inventor
G. B. Humes
By C. A. Snow & Co.
Attorneys

UNITED STATES PATENT OFFICE.

GUY B. HUMES, OF CHICAGO, ILLINOIS.

CONTROL-LEVER DETENT.

1,311,400.  Specification of Letters Patent.  Patented July 29, 1919.

Application filed October 31, 1918. Serial No. 260,476.

*To all whom it may concern:*

Be it known that I, GUY B. HUMES, a citizen of the United States, residing at Chicago, in the county of Cook and State of Illinois, have invented new and useful Improvements in Control-Lever Detents, of which the following is a specification.

The subject of this invention is a detent for the control lever of an automobile, and is intended for use, primarily, on automobiles having two speeds and in which the control lever is operated by foot.

A main object of the invention is the provision of means for preventing the lever passing beyond neutral until some special act is performed by the operator of the car.

Another object of the invention is the provision of a detent which may be adjusted to suit varying conditions.

Another object of the invention is the provision of means for normally retaining the detent in lever engaging position.

Another object of the invention is the provision of an adjustable heel engaging member.

The invention also contemplates generally improving the construction and enhancing the utility of a control lever detent.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical construction for carrying out the invention is shown in the accompanying drawing, wherein:—

Figure 1 is a plan view of a detent constructed in accordance with the invention, shown in place upon the foot board of an automobile, a fragmentary portion of which is shown;

Fig. 2 is a rear elevation;

Fig. 3 is a section on the line 3—3 of Fig. 1;

Fig. 4 is a fragmentary sectional view taken on the line 4—4 of Fig. 1;

Fig. 5 is a fragmentary view in side elevation;

Fig. 6 is a fragmentary plan view of a modification.

Referring to the drawing by numerals of reference:—

In carrying out the invention, a plate 1 is provided which is apertured for the reception of screws 2 or the like, by which it is attached to the foot board of an automobile. The plate 1 has a stud 3 secured thereto and rising therefrom, and this stud is in pivotal engagement with one end of a bar or arm 4.

That end of the bar or arm 4 remote from the pivoted end is formed with a cross arm extending laterally to one side thereof, and bent back upon itself to from the loop 5. The meeting ends of this cross piece or arm may be secured together by a rivet 6 or otherwise. In the upper bar of the loop 5 are formed spaced apertures 7 which are arranged longitudinally of the bar. A screw bolt 8 passes through a selected one of the apertures 7, and serves to clamp upon the loop 5 an inverted U-shaped member or post 9, the other end, 10, of which is reduced to selectively engage one of the apertures 7 and so adjust the post to a position of proper resistance.

A plate 11 is secured to the foot board of the automobile by screws or otherwise, and the loop 5 rests upon and slides longitudinally of this plate. Spaced tongues 12 and 13 extend from one longitudinal edge of this plate, and these tongues are bent back to overlie the plate 11, leaving a space between the plate and the tongues for the reception of the lower bar of the loop 5. The tongue 13 is preferably formed with a laterally extending end as shown, which end serves to limit the movement of the arm 4 and loop 5 in one direction. A lug 14 is struck up from the tongue 13 and is apertured to receive one end of a retractile spring 15, the other end of which is passed through an aperture formed in the loop 5. This spring serves to restore the arm 4 and loop 5 to normal position when they have been swung to one side.

A plate 16 rests upon the arm 4 and is formed, at its forward end, with a down-turned tongue 17 which enters a slot 18 formed longitudinally of the arm 4. The engagement of this tongue with the slot serves to retain the forward end of the plate in proper alinement. A screw bolt 19 passes through an aperture formed in the arm 4 and extends through a slot 20, formed longitudinally of the plate 16, and a wing nut 21, or the like, is threaded on the screw 19 for the purpose of clamping the plate 16 in adjusted position on the arm 4. The plate 16 extends laterally to one side of the arm 4 for the purpose of providing a shoulder 22, against which the arm of the foot lever 23 will strike in its forward movement.

The lever 23 rises through a slot 24 formed in the foot board 25 of the automobile.

In the modified form shown in Fig. 6, the plate 16 is replaced by a plate 16', the laterally extending edge of which is provided with a notch 26, providing shoulders 22' against which the lever 23 may strike on either its forward or backward movement. In this instance, the slot 20' is preferably formed near the rear end of the plate.

In practice the device operates in the following manner:—

When the automobile is at rest with the lever in neutral, the parts are in the position shown in Fig. 1, with the detent in position to prevent a forward movement of the lever to low speed. In order, then, for the operator to start the machine, he must first deliver a sidewise thrust with his heel to the post 9, thus swinging the detent upon the pivot 3, and releasing the shoulder 22 from the lever 23. After this movement has been accomplished, the detent will be forced toward normal position by the tension of the spring 15, and the detent will, under this force, assume normal position as soon as the lever again reaches neutral.

From the foregoing it will be evident that the lever will always be stopped at neutral and there will be no danger of the operator inadvertently passing beyond that position.

Having thus described the invention, what is claimed as new and sought by Letters Patent, is:—

1. A control lever detent, including a plate, an arm pivotally secured to the plate, a laterally extending portion on the arm, a post rising from the laterally extending portion and adapted to be contacted to swing the arm and extending portion, a resilient element for restoring the arm to normal position, and a lateral projection on the arm providing a shoulder to engage a control lever.

2. A control lever detent, including a plate, an arm pivotally secured to the plate, a laterally extending loop on the arm, a post rising from the loop and to be contacted to swing the arm upon its pivot, a guide plate supporting the loop, a resilient element between the guide plate and the loop for restoring the arm to normal position, and a plate adjustable on the arm and extending laterally therefrom, the said plate presenting a shoulder to contact a control lever.

3. A control lever detent, including a plate, an arm pivotally secured to the plate, a laterally extending loop on the arm, a post rising from the loop and to be contacted to swing the arm upon its pivot, means for adjusting the post longitudinally of the loop, a guide plate supporting the loop, a resilient element for restoring the arm to normal position, a plate adjustable on the arm and extending laterally therefrom to provide a shoulder for contacting a control lever, and means for clamping the plate in adjusted position to the arm.

In testimony that I claim the foregoing as my own, I have hereto affixed my signature in the presence of two witnesses.

GUY B. HUMES.

Witnesses:
GEORGE D. SNIDER,
R. E. JENKINS.